United States Patent [19]

Greene et al.

[11] Patent Number: 4,636,998
[45] Date of Patent: * Jan. 13, 1987

[54] ELONGATED RETAINING AND ELECTROMAGNETIC SHIELDING MEMBER FOR A TOWED UNDERWATER ACOUSTIC ARRAY

[75] Inventors: Paul L. Greene, La Crescenta; James Appling, Canoga Park, both of Calif.

[73] Assignee: Allied Corporation, Morristown, N.J.

[ * ] Notice: The portion of the term of this patent subsequent to Aug. 27, 2002 has been disclaimed.

[21] Appl. No.: 601,414

[22] Filed: Apr. 18, 1984

[51] Int. Cl.[4] ............................................. H04R 1/44
[52] U.S. Cl. ................................ 367/154; 174/35 MS; 367/130
[58] Field of Search ............... 174/35 MS, 36, 126 C; 367/153, 20, 154, 130

[56] References Cited

U.S. PATENT DOCUMENTS

| | | | |
|---|---|---|---|
| 3,864,148 | 2/1975 | Maeawa et al. | 427/217 |
| 3,967,010 | 6/1976 | Maekawa | 427/306 |
| 4,538,250 | 8/1985 | De Metz et al. | 367/154 |

FOREIGN PATENT DOCUMENTS 2033645 5/1980 United Kingdom ................. 174/36

Primary Examiner—Nelson Moskowitz
Assistant Examiner—Ian J. Lobo

[57] ABSTRACT

An elongated retaining and electromagnetic shielding member for a towed underwater acoustic array which includes a plurality of interconnected hydrophones and circuit modules protected by a plastic foam cushioning sheath, covered with a tough, essentially acoustically transparent hose-like jacket and containing a plurality of aramid fiber ropes as strength members to carry the tensile loads on the array, wherein the retaining and shielding member consists of an an elongated tube-like electrically conductive fabric member interposed between the sheath and the exterior hose jacket which is longitudinally stitched to provide a plurality of spaced parallel tubes, some of which are of just sufficient diameter to contain said strength members and a larger central tube for containing the hydrophones, circuit modules and interconnecting wires. The strength members are terminated at a connector at each end of the array, and a spacer member is placed near each connector to spread the strength member ropes to the desired diameter. The spacer members and the adjacent ends of the retaining members are each cemented to the strength member ropes.

6 Claims, 5 Drawing Figures

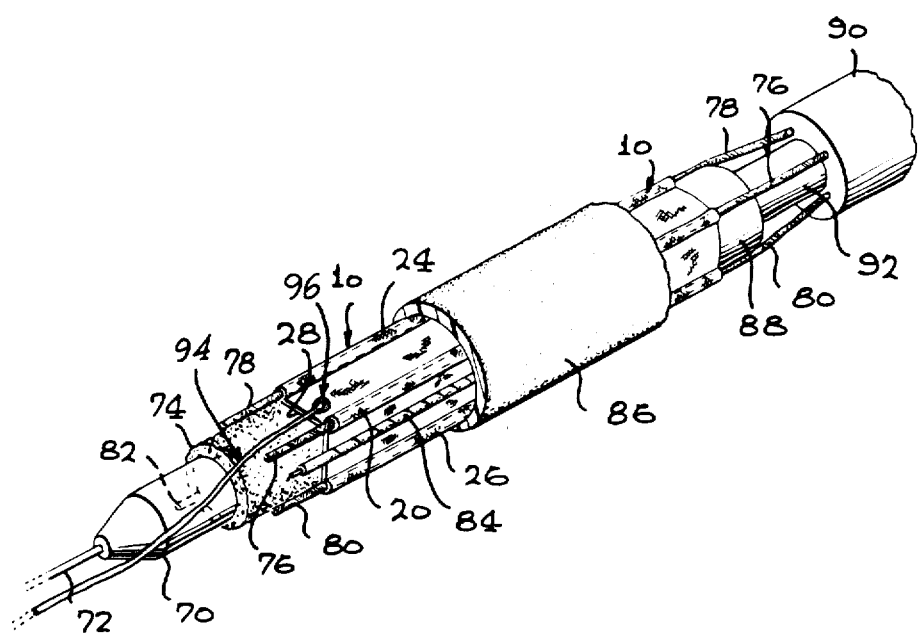

ELONGATED RETAINING AND ELECTROMAGNETIC SHIELDING MEMBER FOR A TOWED UNDERWATER ACOUSTIC ARRAY

This invention relates to an elongated retaining and electromagnetic shielding member for a towed underwater acoustic array.

An elongated towed underwater acoustic or sonar array typically includes a plurality of hydrophones and electronic circuit modules with interconnecting electrical wires and cables, a cushioning material such as plastic foam surrounding the hydrophones and circuit modules, a tubular hose-like jacket of durable plastic within which all the above materials and components are placed, and some form of strength members such as aramid fiber ropes carried in the jacket in such a way as to prevent tensile loading of the internal components. Connector members are secured to each end of the array or array section which provide attachment means for electrical connectors and anchoring means for the strength members.

It is necessary for the towed acoustic array to have enough tensile strength in its strength members to carry its towing load, which may be substantial in the case of an array of few thousand meters long. This normally requires that space be made available to accommodate a number of strength members and that the strength members be secured or anchored in some manner to prevent them from abrading the jacket or the contents of the array. All such arrays must be reeled off and on storage drums in some manner, which also means that they must be capable of withstanding multiple cycles across guide sheaves, etc. This brings increasing danger of damaging the electrical components as the strength members are placed in tension and seek to move toward the center of the drum. Thus, any reasonably successful array design must include means for securing the strength members in their desired position under all circumstances, but particularly during reeling. One common arrangement is to distribute along the array a series of spacers, usually of light but strong plastic material, having peripheral slots or grooves for holding the strength members (aramid fiber ropes) directly against the inside of the tubular hose-like jacket or as close thereto as practicable. This structure is quite operative but does not entirely eliminate the possibility that the strength members will sag or pull in toward the center of the drum between the spacers during the reeling operation, thereby abrading some wires or components. In some cases the spacers have failed structurally during reeling tests or have significantly increased array self noise.

An array structure is disclosed in copending application Ser. No. 453,305 filed in the names of Frederick C. DeMetz and John R. Rackliffe (common assignee) which includes a separate internal sleeve-like retaining member formed of a strong light synthetic fabric such as nylon and sewn or otherwise fastened as by heat sealing to produce longitudinal seams providing a plurality of parallel tubular passages of diameter just sufficient to contain each of the aramid fiber ropes while leaving a central tube of sufficient diameter to contain the hydrophones, electronic housings, padding materials, cables and other conducting wires. This retaining member maintains the position of the strength members all along their length and does not permit them to become displaced or to pull to the inside against the internal array components. The structure also prevents the strength members from abrading against each other.

It is sometimes necessary to provide electrical shielding for sensitive components or subsystems in the array such as the hydrophones or clusters of hydrophones with associated interconnecting wires and cables or other transducers. This shielding reduces electronic and/or electromagnetic pickup by the transducers from internal and external sources. This normally requires an electrically conductive shield that physically encloses the transducer and provides electrical connection to the electronic circuit module(s) from the shield. The shield is therefore also subject to the forces applied during reeling operation. Thus, any reasonably successful array design which uses electrical shielding must provide a means of securing the shields in their desired positions under all circumstances but particularly during reeling. The design must also assure that damage to the shields and/or other internal components and structure does not occur and that system performance is not subsequently degraded. One common arrangement is to provide a metal housing to cover each hydrophone or transducer with either an integral electrical connection or a separate connecting wire. This technique may not provide sufficient shielding for clusters of transducers with the associated interconnecting wiring where the physical length and/or the number of transducer elements increase the total electrical pickup. In this case, a flexible shield may be provided to enclose the entire cluster and interconnecting wiring. The flexible shield is usually made of a light but strong electrically conductive material such as woven wire mesh or cloth, or a fabric that has been made electrically conductive by coating or plating the surface with a conductive material. The shield is fabricated into tubular sections within which the transducers or clusters of transducers are mounted. This structure is quite operative but does require an additional layer of material which may degrade system performance and increases weight and cost.

The construction for an elongated towed underwater acoustic array devised by applicants deals with the above problems by providing a separate internal sleeve retaining structure similar to that described above but formed of a strong, light, electrically conductive synthetic fabric such as silver plated nylon.

An electrical connection is then made to the fabric or an extension of the fabric itself, which is subsequently connected to an appropriate electronic circuit module or other interconnecting wire in the system to provide a ground path. Use of the conductive fabric is therefore quite advantageous since, in addition to providing mechanical protection of the array components, it also functions as an electrical shield for the transducers and their interconnecting wiring.

An additional advantage of the sleeve structure described above is that, in addition to providing the mechanical protection and electromagnetic shielding referred to above, the sleeve structure contributes to achieving very quiet self noise performance at high tow speeds.

The invention will now be described with reference to the accompanying drawings in which:

FIG. 5 is a perspective view, shown partly broken away, of a portion of an elongated sonar array incorporating our invention.

Figure 1:
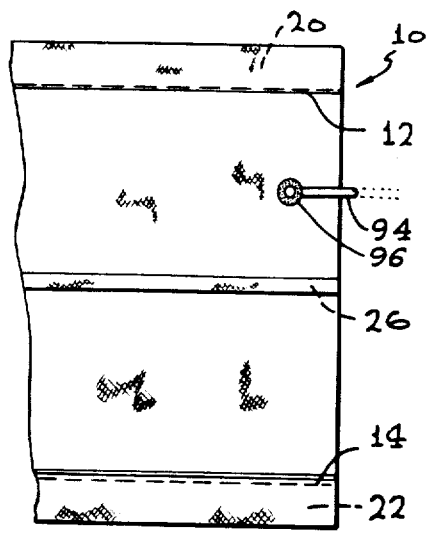
FIG. 1 is a side view showing a short section of one embodiment of a retaining device used in connection with our invention.
Figure 2:
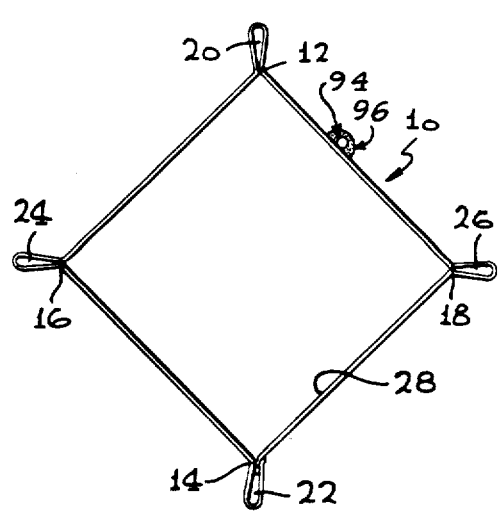
FIG. 2 is an end view of the device of FIG. 1.

Referring now to FIG. 1, a side view of a tube-like retaining member 10 preferably of an acoustically transparent silver-plated nylon fabric is shown which is stitched at longitudinal seams 12 and 14 to produce a plurality of small diameter parallel tubular passages. Also shown is an electrical conductor 94 which is attached to the fabric using a conductive adhesive 96 to provide an electrical connection for the shield. FIG. 2 is an end view of the retaining member 10 of FIG. 1 and shows seams 12 and 14 plus additional seams 16 and 18 which produce a series of small diameter tubular passages 20, 22, 24 and 26 (shown flattened) around the periphery of the retaining member 10 and leaving a large diameter central chamber 28. The dimensions of the retaining member 10 are chosen such that the internal chamber 28 is sufficiently large that it can contain the required hydrophones, electronic modules, interconnecting wires and cables and a layer of foam cushioning surrounding such components. The spacing of the seams 12, 14, 16 and 18 is chosen to provide tubular passages of just sufficient diameter to contain the required aramid fiber ropes. While the drawing does not indicate any particular length for the tube-like retaining member 10, it has been found convenient to fabricate these members in lengths of from one to 3.6 meters since the mechanical threading of the above-described components into the respective central chambers 28 become more difficult with significantly greater lengths. The entire towed array may be several hundred meters long with individual connecting sections having lengths in the order of 27 meters long. These retaining members 10 are stitched together end-to-end to provide the necessary means to contain the aramid fiber ropes for substantially their entire length from a connector at one end of an array section to the connector on the opposite end of the array section. A suitable connector for anchoring the strength members and for connecting array sections is shown in U.S. Pat. No. 4,304,456 issued Dec. 8, 1981, in the name of Minoru Takaki et al (common assignee).

Figure 3:
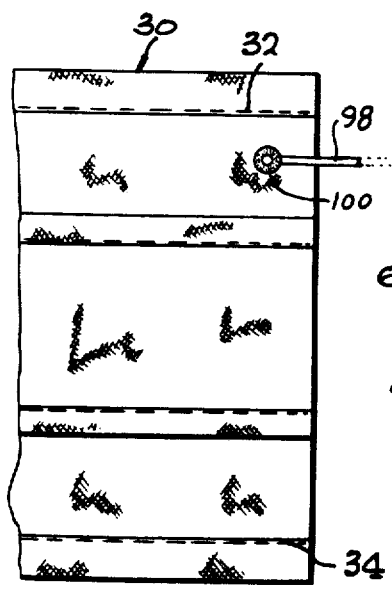
FIG. 3 is a side view showing a short section of another embodiment of retaining device used in connection with our invention.
Figure 4:
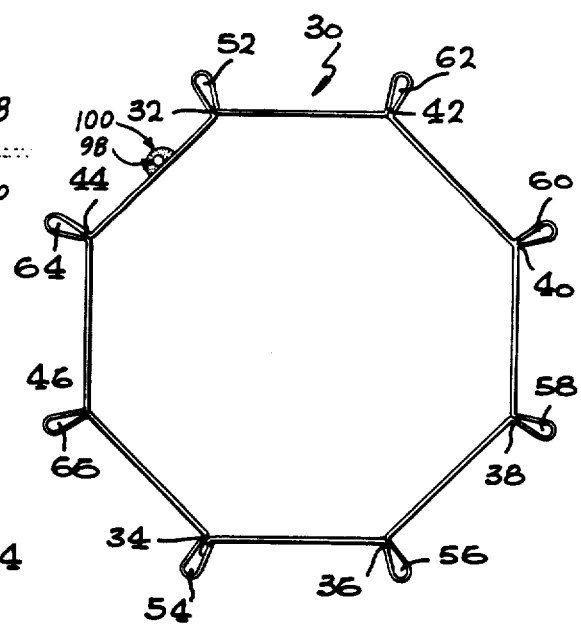
FIG. 4 is an end view of the device of FIG. 3.

A second embodiment of our array tube-like retaining and electromagnetic shielding member is shown in FIGS. 3 and 4 which are essentially analagous to FIGS. 1 and 2 except that the retaining member is formed with more small tubular passageways to contain and separate a large number of strength members—in this case, eight such aramid fiber ropes. On long arrays the tensile loading increases with length of the array, with the array sections nearest the towing vehicle having the heaviest tensile loading. For such sections there may be need for a larger than average number of strength members. In a given array it might well occur that the first two to four sections would require eight ropes, another two to four sections would require six ropes, and the remaining sections would require only four ropes. In FIG. 3, a fabric tube retaining member 30 of silver-plated nylon is shown which is stitched at longitudinal seams 32 and 34 to provide small diameter parallel tubular passages for containing the aramid fiber ropes as described above. An electrical conductor 98 is attached to the fabric retaining member 30 by means of a conductive adhesive 100. From the end view, FIG. 4, it will be seen that the fabric tube-like retaining member 30 is stitched at seams 32, 34, 36, 38, 40, 42, 44 and 46 to provide small tubular passages 52, 54, 56, 60, 62, 64 and 66, respectively. In such retaining members 30 are placed the array components as described above with the additional aramid fiber ropes (strength members) to fill the eight tubular passages. In all other respects the embodiment of FIGS. 3 and 4 is identical to that of FIGS. 1 and 2. Other numbers of small tubular passages could be used depending upon the number of strength members required.

The manner in which the above structure is assembled into the towed array is shown in the perspective drawing, FIG. 5, which depicts a short section of an elongated towed acoustic array shown partially broken away to indicate the relationship of the components. In this view a hydrophone 70 is shown located essentially along the center line of the array including an interconnecting wire 72 (shown broken away). Similarly positioned along the center line of the array are several other such interconnected hydrophones and a plurality of cylindrical electronic housings (which may appear similar to the hydrophone 70). Surrounding and cushioning the hydrophones 70 and the electronic housings is a cylindrical foam sleeve member 74. All this structure is carried in the large centrally disposed internal chamber 28 of the electrically conductive fabric tube-like retaining member 10. In this view appear three of the small diameter tubular passages 20, 24 and 26 which carry strength members 76, 78 and 80, respectively, and the electrical conductor 94 (shown broken away) with its conductive attachment 96 to the fabric. A fourth such strength member 82 is shown extending behind the array. It will be observed that the aramid fiber ropes are each totally enclosed in their respective small diameter passageways which effectively prevent the possibility of their abrading together or pulling inwardly to damage the hydrophones or interconnecting wires. In some case, additional conducting wires may be attached to the outside of retaining members 10, as shown at numeral 84, but these are secured such as to avoid contact with the strength members or the small tubular passageways containing said strength members. Additional small tubular passageways could also be implemented to contain these conducting wires. The entire structure thus far described is then contained in a hose-like jacket 86 of a tough, abrasion-resistant, essentially acoustically transparent material such as polyurethane.

A short section of the retaining member 10 is shown to the right of hose section 86 along with extensions of ropes 76, 78 and 80 which are cemented to peripheral slots in a spacer 88 and then terminated in a connector 90. An electrical cable 92 is shown entering the connector 90 along its axis. The retaining member 10 can be effectively secured in place by cementing short lengths at the end of each of the small diameter tubular passages to its corresponding strength member. This effectively prevents axial movement of the retaining member 10 during reeling and deploying operations. Obviously, other methods may be employed to secure the retaining member 10 to the remainder of the array, but the above system, which is quite readily implemented, has proved satisfactory.

We claim:

1. An elongated retaining and electromagnetic shielding member for use in a towed underwater acoustic array including a plurality of hydrophones and circuit modules interconnected by electrical conducting wires, a sheath of plastic foam material surrounding said hydrophones and said circuit modules, a hose-like jacket of durable plastic material surrounding and containing said sheath, a plurality of strength members contained in said hose-like jacket, and connector members at each end of said array to which said strength members and said electrical wires are attached, characterized in that said retaining and electromagnetic shielding member is interposed between said sheath and said jacket and comprises a cylindrical tube of electrically conductive synthetic fabric, said fabric being longitudinally stitched or seamed at a plurality of locations to provide a structure with a large center tube and a plurality of spaced parallel peripheral tubes of small diameter each of which receives one of said strength members, and an electrical conductor attached to said fabric for connection to a low voltage source.

2. An elongated retaining and electromagnetic shielding member as claimed in claim 1 wherein said fabric is of silver plated nylon.

3. An elongated retaining and electromagnetic shielding member as claimed in claim 1 wherein said fabric is essentially acoustically transparent.

4. An elongated retaining and electromagnetic shielding member as claimed in claim 1 wherein said retaining and shielding member is cemented at its ends to said strength members.

5. An elongated retaining and electromagnetic shielding member as claimed in claim 2 wherein said fabric is essentially acoustically transparent.

6. An elongated retaining and electromagnetic shielding member as claimed in claim 3 wherein said retaining and shielding member is cemented at its ends to said strength members.

* * * * *